United States Patent
Mirville et al.

(10) Patent No.: US 6,396,914 B1
(45) Date of Patent: May 28, 2002

(54) METHOD AND SYSTEM FOR TRANSMITTING ACTIVATION CODES TO A COMMUNICATION DEVICE

(75) Inventors: Jean-Robert Mirville, Manalapan; David Phillip Silverman, Somerville, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/197,740

(22) Filed: Nov. 20, 1998

(51) Int. Cl.[7] .................. H04M 11/00; H04M 15/06; H04M 3/42
(52) U.S. Cl. .................. 379/142.01; 379/93.01; 379/142.15; 379/201.01; 379/201.05
(58) Field of Search .................. 379/140, 142, 379/201, 207, 211, 212, 215, 216, 112, 114, 120, 93.01, 93.25, 100.14, 100.17, 67.1, 142.01, 142.04, 142.06, 142.13, 142.15, 142.17, 142.18, 201.01, 201.02, 201.03, 201.05

(56) References Cited

U.S. PATENT DOCUMENTS

| | | | | | |
|---|---|---|---|---|---|
| 4,567,323 A | * | 1/1986 | Lottes et al. | ................ | 379/201 |
| 5,309,509 A | * | 5/1994 | Cocklin et al. | ............. | 379/165 |
| 5,416,831 A | * | 5/1995 | Chewning, III et al. | .... | 379/201 |
| 5,425,097 A | * | 6/1995 | Pula | ........................... | 379/201 |
| 5,481,595 A | * | 1/1996 | Ohashi et al. | ................. | 379/67 |
| 5,485,511 A | * | 1/1996 | Iglehart et al. | ............. | 379/201 |
| 5,544,236 A | * | 8/1996 | Andruska et al. | ........... | 379/201 |
| 5,550,905 A | * | 8/1996 | Silverman | .................... | 379/142 |
| 5,608,788 A | * | 3/1997 | Demlow et al. | ............. | 379/142 |
| 5,719,922 A | * | 2/1998 | Bremer et al. | ............ | 379/93.01 |
| 5,745,553 A | * | 4/1998 | Mirville et al. | ............. | 379/201 |
| 5,822,415 A | * | 10/1998 | Gordon | ........................ | 379/140 |
| 5,875,240 A | * | 2/1999 | Silverman | .................... | 379/142 |
| 5,933,763 A | * | 8/1999 | Wang et al. | ................ | 455/31.3 |
| 5,950,114 A | * | 9/1999 | Balachandran et al. | .... | 455/38.1 |
| 5,970,125 A | * | 10/1999 | Smith et al. | ............. | 379/93.25 |
| 6,016,341 A | * | 1/2000 | Lim | ............................ | 379/142 |
| 6,035,335 A | * | 3/2000 | Franke et al. | ................ | 709/232 |
| 6,041,111 A | * | 3/2000 | Shelton | ........................ | 379/201 |
| 6,072,859 A | * | 6/2000 | Kong | ........................ | 379/88.16 |
| 6,122,349 A | * | 9/2000 | Kredo et al. | ............. | 379/93.25 |
| 6,163,598 A | * | 12/2000 | Moore | ........................ | 379/93.23 |
| 6,198,811 B1 | * | 3/2001 | Klose et al. | ................. | 379/133 |
| 6,233,323 B1 | * | 5/2001 | Ali et al. | ................... | 379/93.27 |
| 6,240,172 B1 | * | 5/2001 | Zhu | ............................ | 379/201 |
| 6,256,378 B1 | * | 7/2001 | Iggulden et al. | ........ | 379/102.03 |
| 6,266,404 B1 | * | 7/2001 | Chon et al. | .................. | 379/201 |

OTHER PUBLICATIONS

The 5ESS Switching System, AT&T Technical Journal, vol. 64, No. 6, part 2, pp. 1305–1564, Jul./Aug. 1985.
Conversant: 1 Voice system: Architecture and Applications, AT&T Technical Journal, vol. 65, Issue 5, pp. 34–47, Sep./Oct. 1986.

* cited by examiner

Primary Examiner—Curtis Kuntz
Assistant Examiner—Quoc D. Tran
(74) Attorney, Agent, or Firm—Oliff & Berridge, PLC

(57) ABSTRACT

A communications system is designed to allow an end-user device that is coupled to a telephone set to receive activation codes that are transmitted thereto by a switch of such communications system when the telephone set is in an on-hook position. The communications system may initiate the transmission of the activation codes to the end-user device. Alternatively, the end-user device may poll the communications system to receive the activation codes therefrom. The end-user device may invoke a communications service in real time by transmitting to the communications system activation codes stored in its memory via an SVD channel modem while another SVD channel is being used for another communication service.

23 Claims, 4 Drawing Sheets

METHOD AND SYSTEM FOR TRANSMITTING ACTIVATION CODES TO A COMMUNICATION DEVICE

TECHNICAL FIELD

This disclosure relates to communications systems and, more particularly, to a method for communicating activation codes to a communications device.

BACKGROUND

Communications services providers have long complained about their inability to make new features available to their subscribers without incurring high advertising costs. For example, millions of dollars have been spent to publicize the automatic callback feature that allows a user to automatically place a call to the last incoming calling number (which may be unknown) by pressing an activation code, such as *69. Because the advertising expenses are significant, communications services providers have to charge a high transaction fee for the automatic callback feature to recoup their advertising expenses, and earn a reasonable return on their investments. The high transaction fee for the automatic callback feature prevents a significant number of communications services users from invoking the feature In an attempt to find a solution to this problem, Mirville and Silverman in U.S Pat. No. 5,745,553 proposed a solution that allows a user to receive on a display of a caller-id box, information related to communications features available to such user. According to the Mirville-Silverman solution, the communications system constantly transmits communications services features information to a subscriber primarily when the subscriber's telephone set is in an off-hook position. Specifically, the communications services feature information is transmitted to the caller-id box either in-band using the Analog Display Services Interface (ADSI) protocol for analog lines, or via the data channel (D) of an Integrated Services Digital Network (ISD) connection for digital lines. The communications services feature information includes an activation code for each feature as well as the fee for dynamically invoking the feature.

While the Mirville-Silverman solution represents a significant advance over the prior art, the solution however is not without some imperfections. For example, the use of the in-band or the D channel for transmission of the activation codes prevents or impairs the use of such channels for other purposes. The transmission of activation codes in-band can potentially interfere with similar transmission of caller identification information that is typically sent between the first and second rings.

Equally important is the fact that when a communications service feature is invoked for a POTS call, the activation code for such invocation is transmitted in-band. Such in-band transmission unduly interferes with the on-going conversation between calling and called parties. Thus, a solution is needed that implements the Mirville-Silverman teachings while overcoming the deficiencies of the Mirville-Silverman solution.

SUMMARY

The present disclosure is directed to a communications system that allows an end-user device (hereinafter called "a service activator") that is coupled to a telephone set to receive activation codes that are transmitted thereto by a switch of such communications system when the telephone set is in an on-hook position. The principles of the present disclosure can be implemented as either a downloading process or as a polling process. In the downloading process, the communications system initiates the transmission of the activation codes to the service activator. In the polling process, the service activator initiates the reception of activation codes therein.

In an exemplary embodiment of the principles of the downloading process, an adjunct processor that is coupled to a switch of the communications system places a call to the telephone number associated with the telephone set for the purpose of downloading activation codes to the service activator. The adjunct processor is equipped with an auto dialer that is capable of initiating calls to telephone sets and other communications devices. For the purpose of receiving activation codes, the service activator operates in a manner similar to an answering machine inasmuch that it is arranged to receive information when the telephone set is still in an on-hook position after a predetermined number of rings. The service activator of the present disclosure includes a Simultaneous Voice over Data (SVD) modem that is equipped with a ringing tone suppressor and an auto dialer.

The switch to which the telephone set is coupled is arranged to send a distinctive signal ringing tone to the telephone line for calls initiated by the adjunct processor. Upon receiving the distinctive ringing tone, the service activator suppresses ringing to the telephone set and transmits a "Data Set Ready" (DSR) signal to the adjunct processor. The reception of the DSR signal by the adjunct processor triggers the information downloading process. At the end of the process, the adjunct processor terminates the call.

Alternatively, the adjunct processor may send a paging signal to a paging receiver of the service activator. Upon receiving the paging signal, the service activator initiates the polling process described below.

In an exemplary embodiment of the polling process, the service activator uses its auto dialer to initiate a call to the adjunct processor that is coupled to the switch serving the service activator. Upon completion of the call, the adjunct processor uses the Automatic Number Identification (ANI) associated with the call to determine the appropriate activation codes to be downloaded to the storage area of the service activator. Thereafter, the adjunct processor transmits the appropriate activation codes to the service activator.

DETAILED DESCRIPTION

Figure 1:
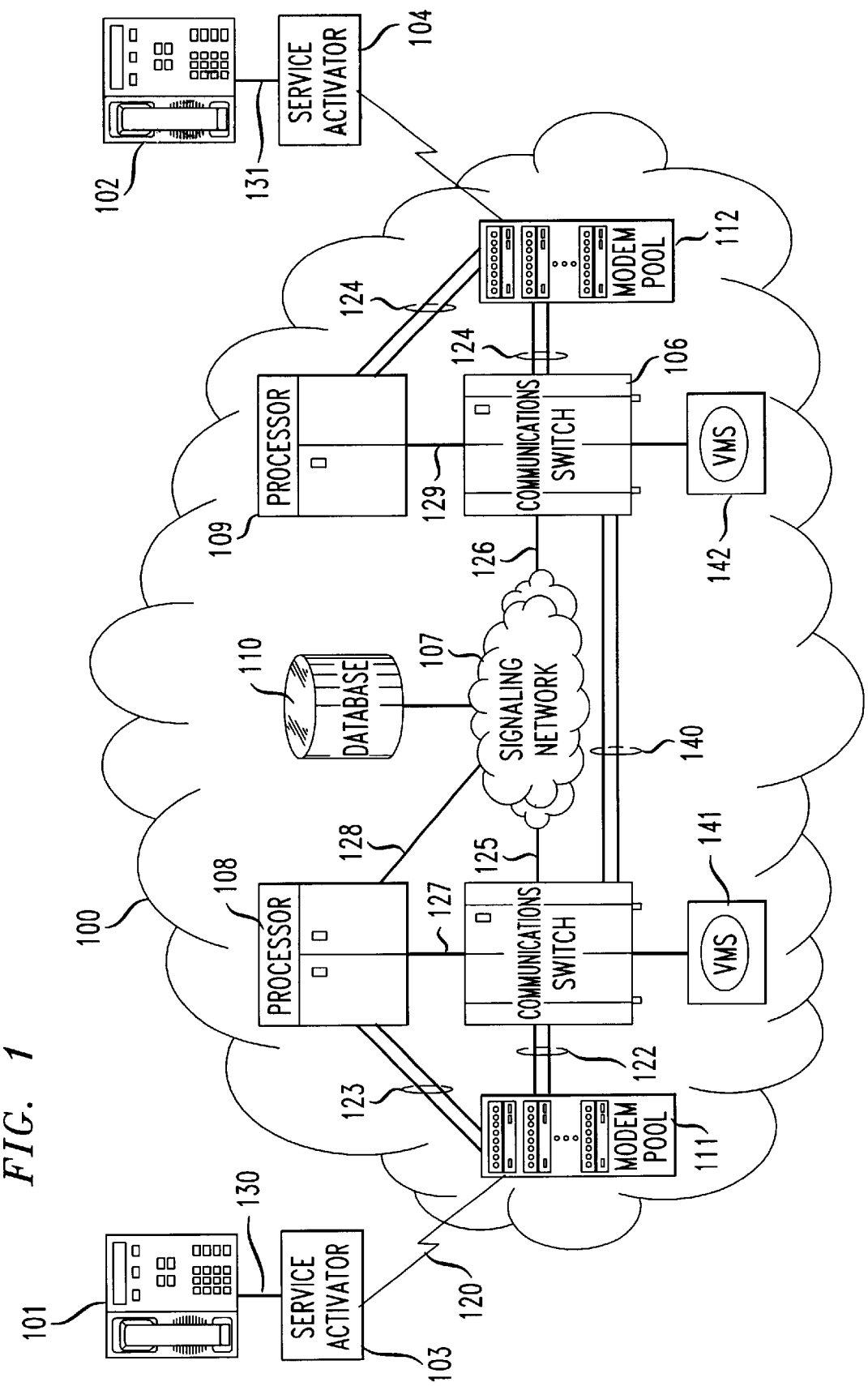
FIG. 1 shows in block diagram format a communications network arranged in accordance with the principles disclosed herein to allow an adjunct processor to transmit appropriate activation codes to an service activator.

FIG. 1 shows in block diagram format a communications network 100 which includes modem pools 111 and 112, access/egress communications switches 105 and 106 and adjunct processors 108 and 109. For the sake of clarity and ease of explanation, components of FIG. 1 that are identical will be described individually when appropriate, with the corresponding identical component indicated in parentheses."

Access/egress communications switches 105 and 106 of FIG. 1 are connected to a common signaling network 107 via trunk facilities 125 and 126, respectively. Communications switch 105 (106) is a processor-controlled, software-driven communications systems that is arranged to route calls to destinations specified in call setup information received from service activators such as analog telephone set 101 (102). A well-known communications switch is the Lucent Technologies 5ESS® switch whose features and functionality are described in different articles published in the AT&T Technical Journal, Vol. 64, No. 6, part 2, pp. 1305–1564, July/August, 1985.

Communications switches 105 and 106 exchange call processing messages via signaling network 107 and signaling trunks 125 and 126. Signaling network 107 is comprised of a plurality of interconnected packet switching nodes that route call processing messages to their appropriate destinations according to a defined protocol, such as the well-known Common Channel Signaling (CCS) protocol. It is worth noting that although the communications system 100 of FIG. 1 does not show (for the sake of simplicity) any toll switches or Inter-exchange carrier network, it is to be understood that one or more toll switches may be included in communications system 100.

Also shown in FIG. 1 is SVD modem pool 111 (112) that is coupled to communications switch 105 (106) via trunk 121 (122). Specifically, trunk 121 is connected to the voice ports of the SVD modems in the pool while the data ports of the SVD modems are coupled to facility 123 (124) that connects such data ports to adjunct processors 108 (109). As is well known in the art, an SVD modem allows simultaneous voice and data (SVD) signals to be transmitted to separate voice and data destinations. In the present disclosure, the SVD modems in the pool and the SVD modems in the service activator 103 (104) exchange SVD signals that include multiplexed voice and data signals. Specifically, the voice and data signals are de-multiplexed by the SVD modems in the pool to allow the voice signals to be directed to communications switch 105 (106) via trunk facility 121 (122) and the data signals to be routed to adjunct processor 108 (109) via trunk facility 123 (124).

Figure 3:
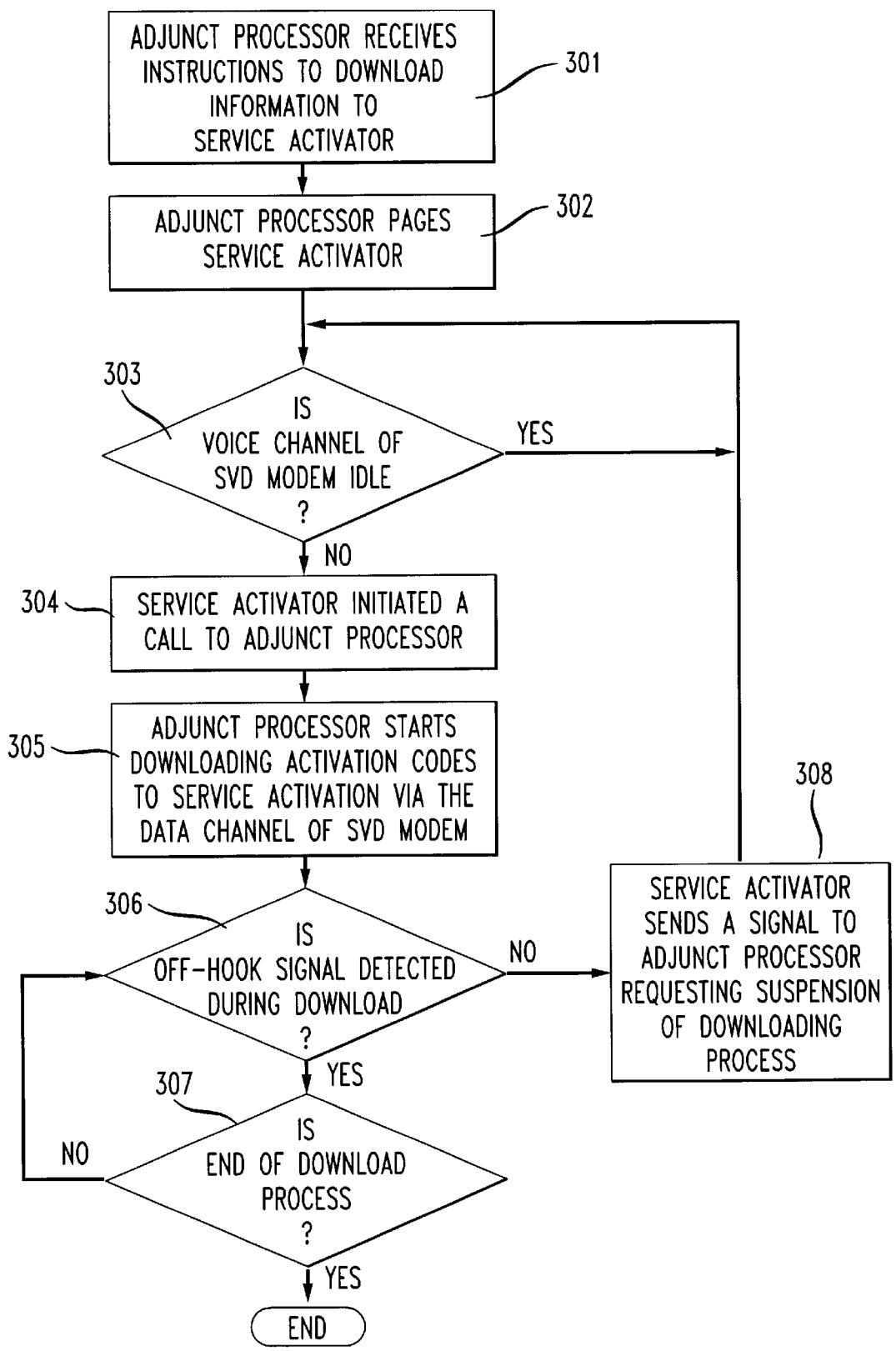
FIGS. 3 and 4 illustrate programmed instructions executed by different components of FIG. 1 to implement the principles disclosed herein.
Figure 4:
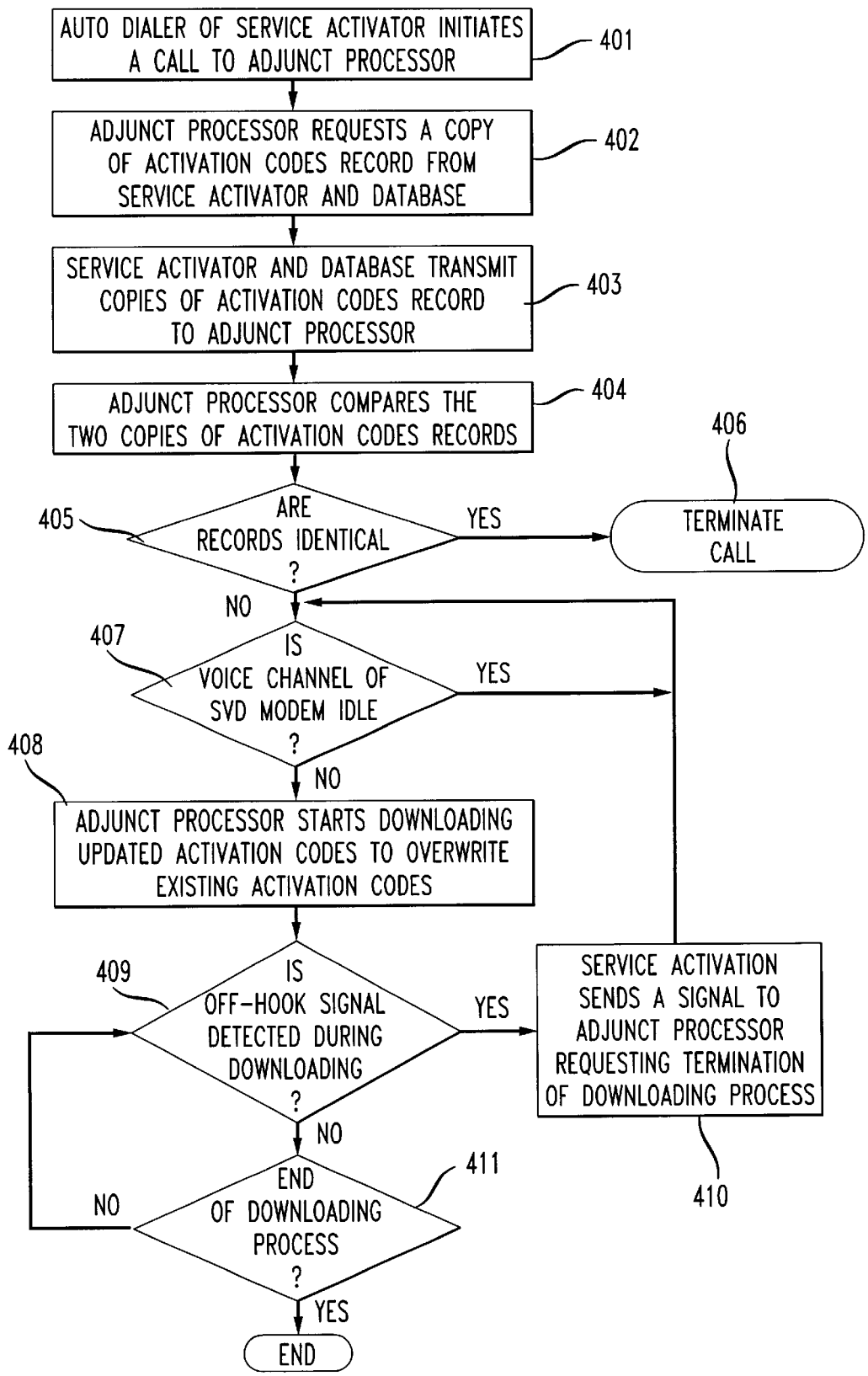

Adjunct processor 108 (109) is a general-purpose computer that is suitably arranged to execute some of the instructions set forth in FIGS. 3 and 4. Adjunct processors 108 (109) is equipped with auto dialers that allow such processor to place calls to destinations selected by database 110. Calls placed by adjunct processor 108 (109) include paging calls directed to service activator 103 (104). Specifically, adjunct processor 108 (109) is arranged to send call handling instructions to communications switch 105 upon receiving an activation code from service activator 103 (104), as described in further detail below. Other calls placed by adjunct processor 108 (109) include paging calls directed to service activator 103 (104).

FIG. 1 also shows database 110 that is a processor-controlled database management system suitably arranged to store a list of features subscribed by each line connected to communications switch 105 (106). Associated with each feature in the list is a fee for invoking such feature. An exemplary representation of one such list is shown in FIG. 4 of U.S. Pat. No. 5,745,553 that is incorporated herein by reference. Database 110 also stores information related to the directory number or Automatic Number Identification (ANI) of each subscriber. Such directory number or ANI is used to identify the telephone number associated with the service activator for a particular subscriber and to determine the set of activation codes that are appropriate for such particular subscriber. For example, database 110 may download to the service activators of heavy communications services users, certain advanced communications services features, such as multi-party services features, while the service activators of casual communications services users may receive basic communications services features such as caller-id and call forwarding. Database 110 also stores information related to When communications switch 105 (106) needs to present an announcement to a caller or a called party, the switch sends a signal to Voice Messaging System 111 (112) to deliver a chosen message to the party. Specifically, upon receiving appropriate commands from adjunct processor 107 (108), communications switch 105 (106) transmits a pre-defined signal to VMS 111 (112) instructing the VMS to deliver a particular type of announcement to a called party. When VMS 111 (112) receives the pre-defined signal from communications switch 105 (106), VMS 111 (112) fetches its memory to retrieve a pre-defined set of scripts that are executed for delivery of a pre-recorded voice announcement. Such announcement typically prompts the calling or called party to enter some digits or delivers a message to the calling or called party A voice messaging system may be implemented using the AT&T Conversant® Voice System whose architecture and features are described in *AT&T Technical Journal* Vol. 65, Issue 5, pp. 34–47, September/October 1986.

It is worth noting that although communications switch 105 (106), adjunct processor 108 (109) and VMS 111 (112) are shown in FIG. 1 as separate components, persons skilled in the art may combine such components into a single piece of equipment capable of providing the features and functionality of the aforementioned components.

Figure 2:
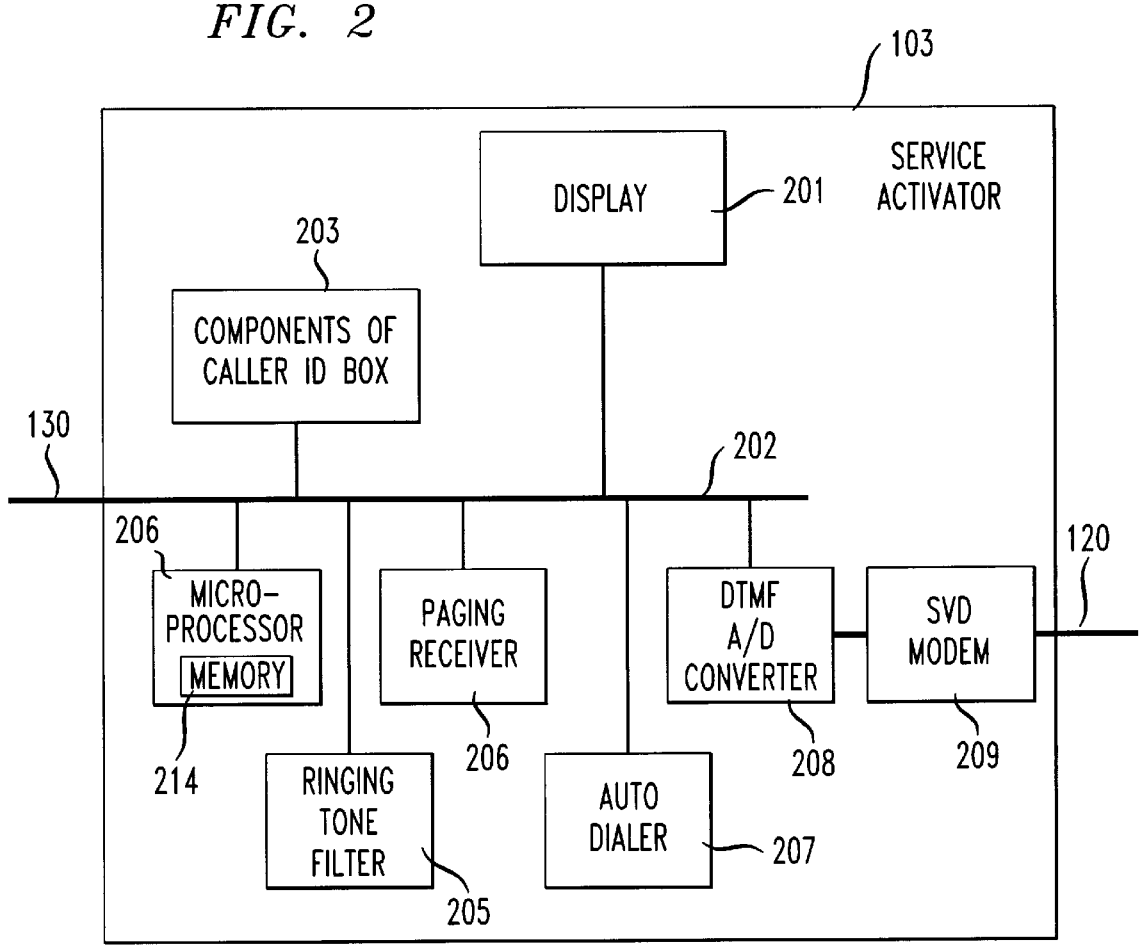
FIG. 2 illustrates a schematic diagram of the major components of an service activator that is used to implement the principles of the present disclosure.

FIG. 2 illustrates a schematic diagram of the major components of an service activator that is used to implement the principles of the present disclosure. Shown in FIG. 2 are display 201, bus 202, components of caller-id display unit 203, microprocessor 204, ringing tone filter 205, paging receiver 206, auto dialer 207, Dual Tone Multi Frequency (DTMF) Analog-to-Digital (A/D) converter 208, SVD modem 209 and DTMF filter 210. Each component of service activator 103 (104) has a distinct address that identifies such component in communications with other components of the activator. Specifically, communications signals exchanged between two components of service activator 103 (104) include a) a header address that identifies the source of the signal b) a destination address that indicates the component to which the signal is directed, and c) the particular message transmitted to the destination component. All such communications are transmitted and received via bus 202 that serves as the common link which allows each component to select to receive only signals addressed thereto.

Service activator 201 is a caller-id display unit suitably modified to implement the principles of this disclosure. Hence, all the components of a conventional caller-id display unit including Caller ID capture chips, on-board storage area, line interface unit, converter, control circuit, to name a few are represented in component 203. Addition information related to caller-id display unit may be found in U.S. Pat. No. 4,582,956 that issued on Apr. 15, 1986 and that is incorporated herein by reference.

Display 202 is a video output screen that may be implemented preferably as a Liquid Crystal Display (LCD) capable of displaying alphabetic and numeric data such as ASCII characters. Alternatively, Display 202 may be implemented as a plurality of interlaced seven-segment displays or a combination of simple Light Emitting Diodes (LED). The latter implementation may be preferable if service activator 103 (104) has an independent power supply; i.e. does not receive its power directly from communications switch 105 (106). Display 202 may also include a display controller chip that stores in its non-volatile memory a display driver that allows display 202 to support different types of display modes (resolutions and pixel depths) that are selectable by a user through a simple physical interface such as a resolution selection button.

At the heart of service activator 103 (104) is microprocessor 204 that stores in memory 214 the activation codes record, some of the instructions set forth in FIGS. 3 and 4 as well as the internal logic of the microprocessor. Such internal logic may include an operating system for small devices such as Windows® CE from MicroSoft® or Inferno® from Lucent Technologies. Microprocessor 204 is a specialized semiconductor chip that is designed to take specific actions based on input received via bus 202 from telephone set 101 (102) or adjunct processor 108 (109). For example, when adjunct processor 108 (109) pages service activator 103 (104), the paging signal is received at paging receiver which promptly sends a processing signaling message to microprocessor 204. Such processing signaling message includes in addition to the origination and destination address the telephone number associated with adjunct processor 108 (109). Upon receiving such message, microprocessor 204 instructs auto dialer 207 to compose the telephone number associated with adjunct processor 108 (109).

Microprocessor 204 also coordinates all functions performed by service activator 103 (104). For example, microprocessor 204 coordinates timing of signals between the components as well as between service activator 103 (104), telephone set (101 (102) and the components of network 100.

Paging receiver 206 is a wireless receiver that is suitably arranged to receive alphanumeric or numeric wireless signals via radio waves transmitted thereto by signals from a commercial paging system such as PageMart in the United States. Paging receiver 206 includes a decoder that is designed to decode the data from the paging signal and to correct errors in such signals when possible. Data in the paging signal include address signals that allow the receiver to determine whether a particular message is directed to the receiver. When the receiver determines that a particular message is destined for such receiver, it automatically forwards the received message to microprocessor 204 for further processing as discussed in detail below.

DTMF A/D converter 204 is an Application-Specific Integrated Circuit (ASIC) that is designed to convert DTMF analog signals into digital signals that are forwarded to SVD modem 209. DTMF A/D converter 204 performs its analog to digital conversion functions only when the voice channel of SVD modem 209 is in use or a data call is initiated by auto dialer 207. When both channels of SVD modem 209 are idle, such as during call setup time, DTMF A/D converter 208 does not convert DTMF signals received from service activator 101 (103) via bus 202. When the voice channel of SVD modem 209 is busy and DTMF analog signals i.e., activation codes, are broadcast over bus 202, DTMF filter 210 screens out the DTMF analog signals in order to prevent the DTMF activation codes from being transmitted via the voice channel of SVD modem 209. DTMF filter 210 also blocks out the dial tone sound when auto dialer 207 places a data call to a pre-determined destination, such as adjunct processor 107 (108).

FIG. 3 illustrates programmed instructions executed by different components of FIG. 1 to download activation codes to service activator 101 (103). The process contemplated by this disclosure is initiated in step 301 when adjunct processor 107 (108) receives a signal from database 110 to download new or updated activation codes to service activator 103 (104). The signal transmitted by database 110 may include one or more activation codes to be added to, or replaced in, the activation code record in service activator 103 (104). Alternatively, the signal may include a new activation code record to overwrite the existing activation code record in service activator 103 (104). Upon receiving such signal, adjunct processor 107 (108) in step 302 pages service activator 103 (104) to indicate its readiness to download the new or updated activation codes. The paging message transmitted by adjunct processor 107 (108) includes the telephone number associated with a data port of adjunct processor 107 (108). After receiving the paging message, service activator 103 (104) in step 303 ascertains whether the voice channel of SVD modem 209 within the service activator is idle. If so, service activator 103 (104) in step 304, places a data call to adjunct processor 107 (108) via the data channel of SVD modem 209. After the appropriate handshaking procedures have been established between service adjunct processor 107 (108) and service activator 103 (104), adjunct processor 107 (108) in step 305, starts downloading the new activation codes record or the one or more updated activation code(s).

If the voice channel of SVD modem 209 is not idle (after service activator 103 (104) has received the paging message), as determined in step 303, service activator continues to check the status of the voice channel of SVD modem 209 until such channel becomes available.

When an off-hook signal is detected by service activator 103 (104) during the downloading process, as determined in step 306, microprocessor 204 in step 308 generates a signal that is transmitted to adjunct processor 107 (108) to request termination of the downloading process. Therafter, steps 303 to 306 are repeated until the downloading process is completed, as determined in step 307. An alternative to the termination of the downloading process is to temporarily suspend the process when the off-hook signal is detected. When the handset of telephone 101 (102) goes back on-hook, the downloading process is resumed at the point where it was suspended.

FIG. 4 is a flowchart outlining programmed instructions executed by some of the components of FIG. 1 to implement the principles of the disclosure. The process of FIG. 4 is initiated in step 401 when auto dialer 207 of service activator 103 (104) initiates a call to adjunct processor 107 (108) to request an updated copy of the activation codes record. The process of FIG. 4 may be triggered by microprocessor 204 sending instructions to auto dialer 207 to initiate the call. The instruction in turn may be generated by microprocessor 204 executing a daemon-type program that creates such instructions at periodic intervals e.g., every four weeks. As is well known in the art, a daemon is a computer program that is not invoked explicitly, but lies dormant waiting for some condition(s) (such as expiration of a predetermined amount of time) to occur to trigger execution of the program.

Upon completion of the call, adjunct processor 107 (108) in step 402, requests a copy of the activation codes record from both service activator 103 (104) and database 110 which promptly transmit their respective copy of the activation codes record in step 403. Thereafter, adjunct processor 107 (108) compares the two copies of the activation codes record to ascertain whether the two copies are identical. When the two copies of the activation code records are identical, as determined in step 405, the call is automatically terminated in step 406 resulting in the end of the process. If the two copies of the activation code records are not identical, as determined in step 405, service activator 103 (104) in step 407, assesses whether the voice channel of SVD modem 209 is idle. If so, service activator 103 (104) transmits a signal to adjunct processor 107 (108) which proceeds in step 408 to start downloading updated activation codes to service activator 103 (104) in order to overwrite the activation codes previously stored in memory 214.

Throughout the downloading process, ringing tone detector monitors bus 202 to determine whether any off-hook signal is detected on bus 202. When such a signal is detected, as determined in step 409, service activator 103 (104) in step 410 transmits a signal to adjunct processor 107 (108) to request immediate termination of the downloading process. Thereafter, steps 407 to 409 are repeated until the end of the downloading process, as determined in step 411.

The foregoing is to be construed as only being an illustrative embodiment of the principles of this disclosure. Persons skilled in the art can easily conceive of alternative arrangements providing functionality similar to this embodiment without any deviation from the fundamental principles or the scope of this disclosure.

What is claimed is:

1. A method for downloading activation codes from a communications system to a service activator, said method comprising the steps of:

initiating a call that is directed to said service activator, said call being initiated by an adjunct processor that is coupled to a switch to which a telephone set is connected; and in response to receiving a signal from said service activator indicative of the readiness of said service activator to receive data, transmitting from said adjunct processor activation codes to said service activator such that said activation codes are displayed on a screen of said service activator when said telephone set is in an off-hook position.

2. The method of claim 1 wherein said call which is initiated by said adjunct processor is a paging call.

3. The method of claim 2 further comprising the steps of:

receiving at said adjunct processor a data call that is initiated by said service activator in response to receiving said paging call; and initiating said transmission of said activation codes from said adjunct processor after receiving said paging call.

4. The method of claim 1 wherein said transmitting of said activation codes is performed only when said telephone set is in an on-hook position.

5. The method of claim 1 wherein said transmitting of said activation codes is terminated when said telephone set is taken off hook during said transmission of said activation codes.

6. The method of claim 1 wherein said activation codes are transmitted via a data channel of an SVD modem included in said service activator.

7. A method for downloading activation codes from a communications system to a service activator, said method comprising the steps of:

receiving a call at an adjunct processor that is coupled to a communications switch of said communications system; said call being initiated by a service activator that is coupled to said switch when a telephone set to which said service activator is connected, is in an on-hook position;

determining at said communications system appropriate activation codes to be transmitted to said service activator; and downloading said appropriate activation codes to said service activator such that communications services are invoked by a user when said user enters said downloaded activation codes on a dial pad of said telephone set.

8. The method of claim 7 wherein said call to said adjunct processor is a data call.

9. The method of claim 8 wherein said data call is completed to said adjunct processor, and said adjunct processor receives pre-stored information from said service activator such that said adjunct processor can assess whether said activation codes need to be downloaded to said service activator.

10. A method for downloading activation codes from a communications system to a service activator, said method comprising the steps of:

transmitting a paging signal from an adjunct processor to a service activator;

receiving a data call at said adjunct processor, said data call being automatically initiated by said service activator in response to receiving said paging signal; and downloading a set of activation codes from said adjunct processor to said service activator in response to receiving said data call, the activation codes capable of activating communications services features used with the communications system.

11. The method of claim 10 further comprising the steps of:

receiving pre-stored information from said service activator to said adjunct processor when said data call is completed; and comparing at said adjunct processor said pre-stored information to said activation codes; and performing said downloading step only when said pre-stored information and said activation codes are different.

12. An improved caller-id display unit of the type which has a line interface unit for establishing communications between the caller-id display unit and a communications system, a converter that converts signals received from the communications system into data that is readable by a user, a control circuit configured to control the operation of the caller-id display unit wherein the improvement comprises an SVD modem that is included in the caller-id display unit and that multiplexes over the line interface a) voice signals via a virtual channel for carrying analog information to and from an end-user device and b) data signals via a virtual data channel for carrying digital information to and from said end-user device;

a memory for storing activation codes received from said communications system via said data channel;

a display for presenting on a screen said stored activation codes when a telephone set to which said caller-id display unit is coupled is in an off-hook position; and an auto dialer for initiating calls directed to a processor of said communications system in order to receive therein said activation codes.

13. The caller-id display unit of claim 12 further comprising a paging receiver designed to receive paging signals from said processor of said communications system to initiate transfer data between said caller-id display.

14. The caller-id display unit of claim 12 further comprising a DTMF/AD converter designed to convert DTMF signals received from said telephone set to ASCII data for transmission to said processor.

15. A system for downloading activation codes from a communications system to a service activator, the system comprising:

an adjunct processor that initiates a call that directed to a service activator, said adjunct processor being coupled to a switch to which a telephone set is connected; and means responsive to receiving a signal from said service activator indicative of the readiness of said service activator to receive data, for transmitting activation codes from said adjunct processor to said service activator such that said activation codes are displayed on a screen of said service activator when said telephone set is in an off-hook position.

16. The system of claim 15 wherein said telephone call which is initiated by said adjunct processor is a paging call.

17. The system of claim 16 further comprising:

means for receiving at said adjunct processor a data call that is initiated by said service activator in response to receiving said paging call; and means for initiating said transmission of said activation codes from said adjunct processor after receiving said data call.

18. The system of claim 16 wherein said activation codes are transmitted via a data channel of an SVD modem included in said service activator.

19. A system for downloading activation codes from a communications system to a service activator, said system comprising:

means for receiving a call at an adjunct processor that is coupled to a communications switch of said communications system; said call being initiated by a service activator that is coupled to said switch when a telephone set to which said service activator is connected, is in an on-hook position;

means for determining at said communications system appropriate activation codes to be transmitted to said service activator; and means for downloading said appropriate activation codes to said service activator such that communications services are invoked by a user when said user enters said downloaded activation codes on a dial pad of said telephone set.

20. The system of claim 19 wherein said call to said adjunct processor is a data call.

21. The system of claim 20 wherein said data call is completed to said adjunct processor, and said adjunct processor receives pre-stored information from said service activator such that said adjunct processor can assess whether said activation codes need to be downloaded to said service activator.

22. A system for downloading activation codes from a communications system to a service activator, said system comprising:

means for transmitting a paging signal from an adjunct processor to a service activator;

means for receiving a data call at said adjunct processor, said data call being automatically initiated by said service activator in response to receiving said paging signal; and means for downloading a set of activation codes from said adjunct processor to said service activator in response to receiving said data call, the activation codes capable of activating communications services features used with the communications system.

23. The system of claim 22 further comprising:

means for receiving pre-stored information from said service activator to said adjunct processor when said data call is completed; and means for comparing at said adjunct processor said pre-stored information to said activation codes such said activation codes are downloaded only when said pre-stored information and said activation codes are different.

* * * * *